United States Patent [19]
Mawatari et al.

[11] 4,278,924
[45] Jul. 14, 1981

[54] DIGITAL SERVO APPARATUS

[75] Inventors: Masahiko Mawatari, Kawasaki; Masaaki Tamura, Fujisawa, both of Japan

[73] Assignee: Tokyo Shibaura Denki Kabushiki Kaisha, Kawasaki, Japan

[21] Appl. No.: 943,645

[22] Filed: Sep. 18, 1978

[30] Foreign Application Priority Data

Sep. 21, 1977 [JP] Japan .................. 52-113864

[51] Int. Cl.³ .......................................... G11B 21/04
[52] U.S. Cl. .................................. 318/314; 318/318; 318/608; 318/603; 360/70
[58] Field of Search .............. 318/600, 601, 602, 603, 318/569, 314, 318, 594; 360/37, 70

[56] References Cited
U.S. PATENT DOCUMENTS 4,023,085  5/1977  Bishop et al. ............... 318/603 X
4,101,817  7/1978  Maeda et al. ................ 318/603
4,110,674  8/1978  Enomoto .................... 318/603 X Primary Examiner—B. Dobeck
Attorney, Agent, or Firm—Cushman, Darby & Cushman

[57] ABSTRACT

Digital servo apparatus includes a counter adapted to count inputted reference clock pulses to display time data. The output of the counter is latched by a first tacho pulse (controlled signal) to a first latch circuit and the contents of the first latch circuit is transferred by a second tacho pulse to the second latch circuit and the present count data of the counter is latched to the first latch circuit. A discrimination circuit is adapted to discriminate whether or not a control signal is within a predetermined control amount, based on time difference data latched to the first and second latch circuits, and deliver an output signal corresponding to a predetermined control amount based on the result of discrimination.

18 Claims, 37 Drawing Figures

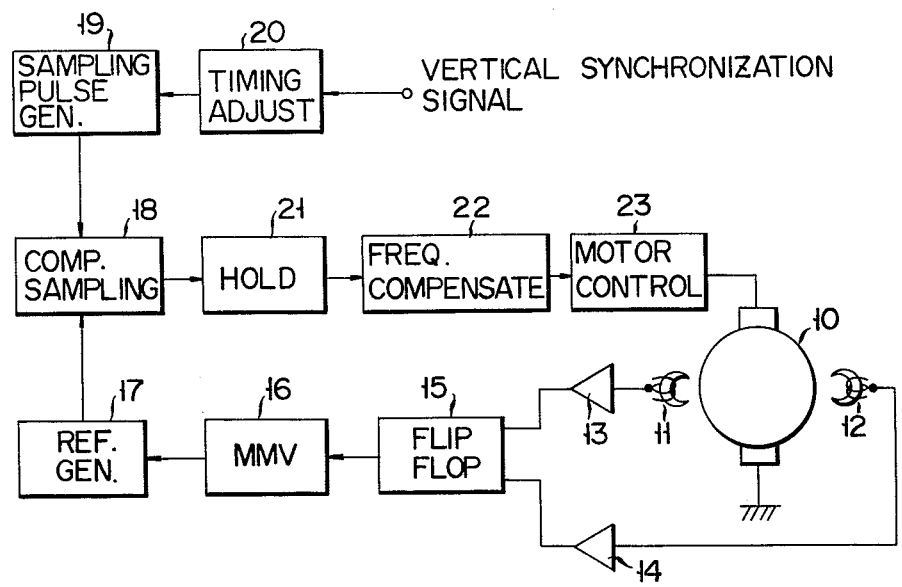
FIG. 1 (PRIOR ART)
FIG. 2A REFERENCE SIGNAL
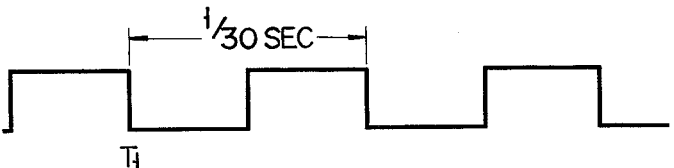
FIG. 2B TIMING CONTROL
FIG. 2C SAMPLING PULSE
FIG. 2D REFERENCE SIGNAL
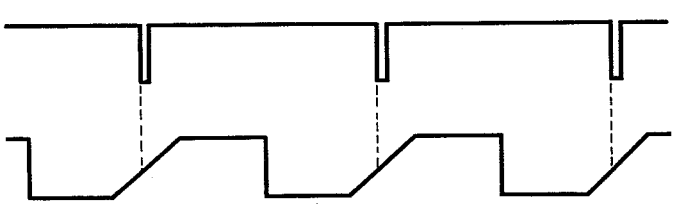
FIG. 2E MONOSTABLE MULTIVIBRATOR OUTPUT
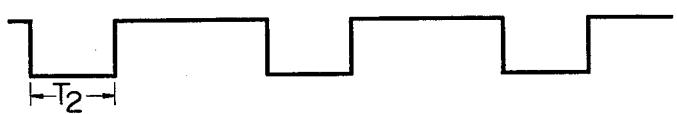
FIG. 2F FLIP-FLOP OUTPUT

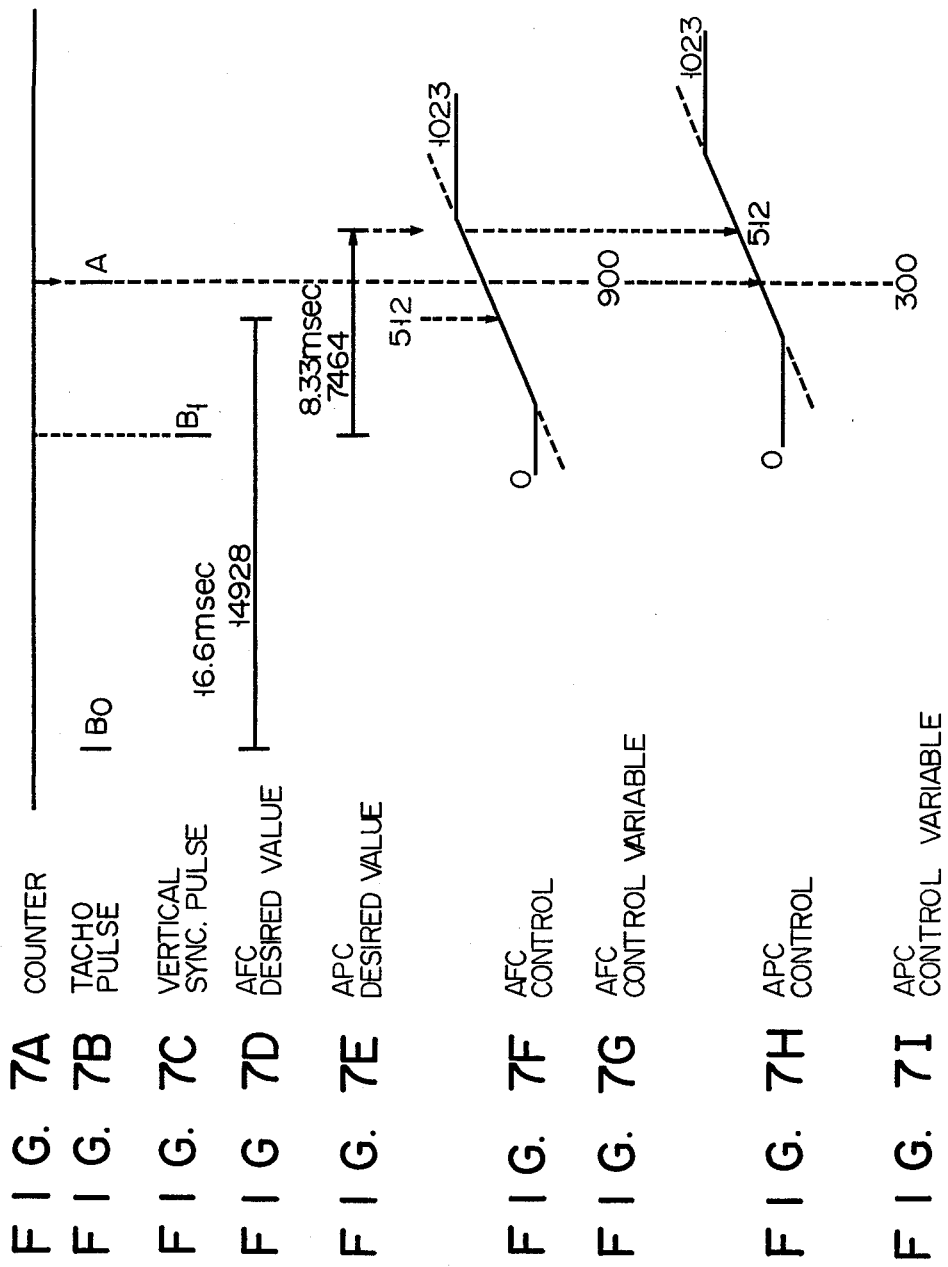

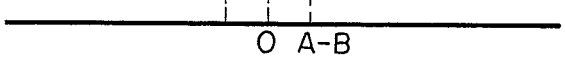

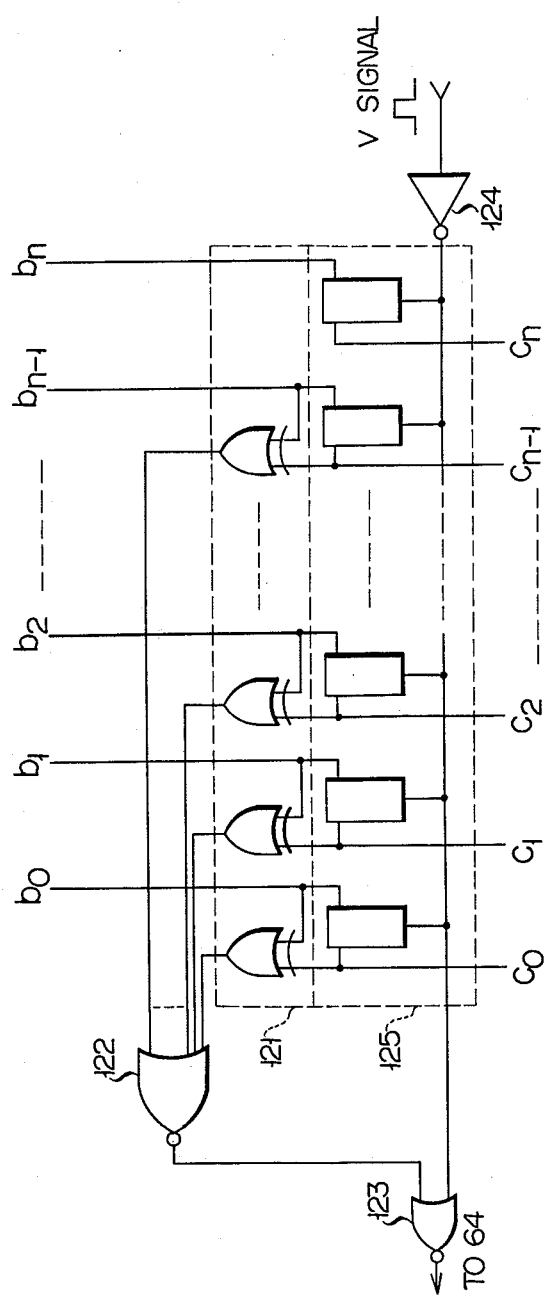
F I G. 12

DIGITAL SERVO APPARATUS

FIELD OF THE INVENTION

This invention relates to digital servo apparatus for controlling rotations of a video tape recorder etc.

A normal video tape recorder (VTR) includes an automatic frequency control circuit (AFC) for stabilizing the rotation of a magnetic head and capstan and an automatic phase control circuit (APC) for causing the rotation of a magnetic head and capstan to synchronize with a record/reproduce signal. An analog signal is conventionally used in an AFC/APC type servo mechanism, the fundamental arrangement of which is shown in FIG. 1.

The servo mechanism is adapted to effect a head rotation phase control. The rotation phase of a motor for rotating a magnetic head is detected by first and second rotation phase detectors 11 and 12.

The rotation phase detectors 11 and 12 are located in a fixed position and has the same construction as the magnetic head. When a disc of a head motor 10 is rotated to bring a permanent magnet on the disc into face to face with the detector, the detector generates tacho pulses. The tacho pulses i.e. detection pulses are supplied respectively through amplifiers 13 and 14 to the set and reset terminals of a flip-flop 15. As a result, the outputs of the flip-flop 15 repeat inverting and non-inverting modes as shown in FIG. 2F each time the tacho pulses are applied to the flip-flop 15. The output of the flip-flop 15 is applied to a monostable multivibrator 16 where it is shaped into rectangular waves (T2 in FIG. 2E) having a predetermined fall interval. The output of the monostable multivibrator 16 is supplied to a reference signal generator 17. The output signal of the reference signal generator 17 assumes a trapezoidal configuration as shown in FIG. 2D and it is applied to a compare/sample circuit 18. A sampling pulse is also supplied from a sampling pulse generator 19 to the compare/sample circuit 18. The sampling pulse has a waveform as shown in FIG. 2C and it is obtained by applying a vertical synchronizing signal (see FIG. 2A) as a reference signal to a timing adjusting device 20 to obtain a timing pulse as shown in FIG. 2B and then applying the timing pulse to the sampling pulse generator 19. Part of the inclined portion of the trapezoidal reference signal as shown in FIG. 2D is sampled and a phase comparison is made between the so sampled signal and the sampling signal as shown in FIG. 2C to develop a voltage corresponding to this phase difference. The voltage is held by a hold circuit 21. That is, the voltage held at the hold circuit 21 represents a phase variation between the rotation phase of the head motor 10 and the phase of a vertical synchronizing signal of the television signal reproduced by the rotation of the head motor 10. The output of the hold circuit 21 is supplied, through a frequency compensation circuit 22 constituted by a low-pass filter, to a motor control circuit 23, thereby controlling the rotation of the head motor 10.

Since an analog signal is used as control data, the so constructed servo apparatus has its operation point varied by a temperature variation and power supply variation and has its control loop disturbed by extraneous noises. Therefore it has been difficult to obtain improved accuracy. Furthermore, a large-capacitance capacitor is required in the hold circuit, monostable multivibrator and so on and an increasing number of external parts are required in obtaining an IC version of the servo apparatus, making it unsuitable to obtain a compact unit.

As one solution to such problems it is contemplated to provide a circuit for measuring a control amount using a digital signal. FIG. 3 shows a device for measuring a control amount of an AFC loop in a capstan control system.

The set terminal S of a flip-flop circuit 32 is connected to the output of a shift register 31. The flip-flop circuit 32 is rest by the tacho signal applied to the shift register 31. The output of the flip-flop circuit 32 opens and closes a clock gate circuit 34 at the input and of a counter 33. The counter 33 is a binary counter and data corresponding to the count number of the counter is supplied in binary form to a latch circuit 35. The output of the latch circuit 35 is supplied to a digital/analog converter 36 where it is converted into an analog amount. The so converted analog control amount is applied through the frequency compensation circuit 22 and motor control amplifier 23 to the motor 10. The shift register 31 effects transfer of tacho pulses in response to the clock pulses and at the same time the flip-flop 32 is reset, causing the gate circuit 34 to be closed. The counter circuit 33 is cleared by a clear pulse from an output terminal. Thereafter, the output of the flip-flop 32 is inverted with one phase delay. At a result, the gate circuit 34 is opened and the counter 33 counts clock pulses from the initial state until the next tacho pulse is applied to the shift register 31. The count data of the counter is latched to a latch circuit 35 by a latch pulse which is produced from an output terminal 38 of the shift register 31. The so latched count number is converted by the digital/analog converter 36 to an analog signal. Such servo apparatus requires a number of control amount measuring devices (disc type AFC and APC controls, capstan type AFC and APC controls) and thus a greater number of parts.

Furthermore, a complicated counter control and discrimination control results.

It is accordingly the object of this invention to provide digital servo apparatus which converts control data to a digital data to prevent a drift resulting from a temperature variation and power supply variation to provide accurate sampling and holding, can suppress influences from noises, is suitable for semiconductor IC-version and thus permits a compact unit, and can reduce a number of parts or elements required.

To attain this object, a digital servo apparatus comprises a binary counter responsive to clock pulses to deliver a count output in binary form, first memory circuit means connected to the binary counter to store the count ouput upon receipt of a first latch pulse, second memory circuit means connected to the first memory circuit means to store an output of the first memory circuit means upon receipt of the first latch pulse, and a data processing circuit means connected to the first and second memory circuit means to calculate a control amount from a difference between the output data of said first memory circuit means and the output data of the second memory circuit means.

FIG. 1 is an explanatory view showing a conventional analog servo apparatus;

FIG. 2 shows waveforms of parts of the apparatus of FIG. 1;

FIG. 2A is a waveform of a reference signal applied to a timing adjusting circuit;

FIG. 2B is a waveform of an output signal of the timing adjusting circuit of FIG. 1;

FIG. 2C is a waveform of an output signal of a sampling pulse generator of FIG. 1;

FIG. 2D is a waveform of an output signal of a reference signal generator of FIG. 1;

FIG. 2E is a waveform of an output signal of a monostable multivibrator of FIG. 1;

FIG. 2F is a waveform of an output signal of a flip-flop circuit of FIG. 1;

FIG. 7 is a time series circuit for explaining the operation of a digital servo apparatus;

FIG. 10 is a time series diagram for explaining the operation of the circuit of FIG. 9;

FIG. 11 is a signal waveform diagram for explaining the operation of the circuit of FIG. 9;

FIG. 12 is a block diagram showing another form of a dummy vertical synchronizing signal generator;

Figure 3:
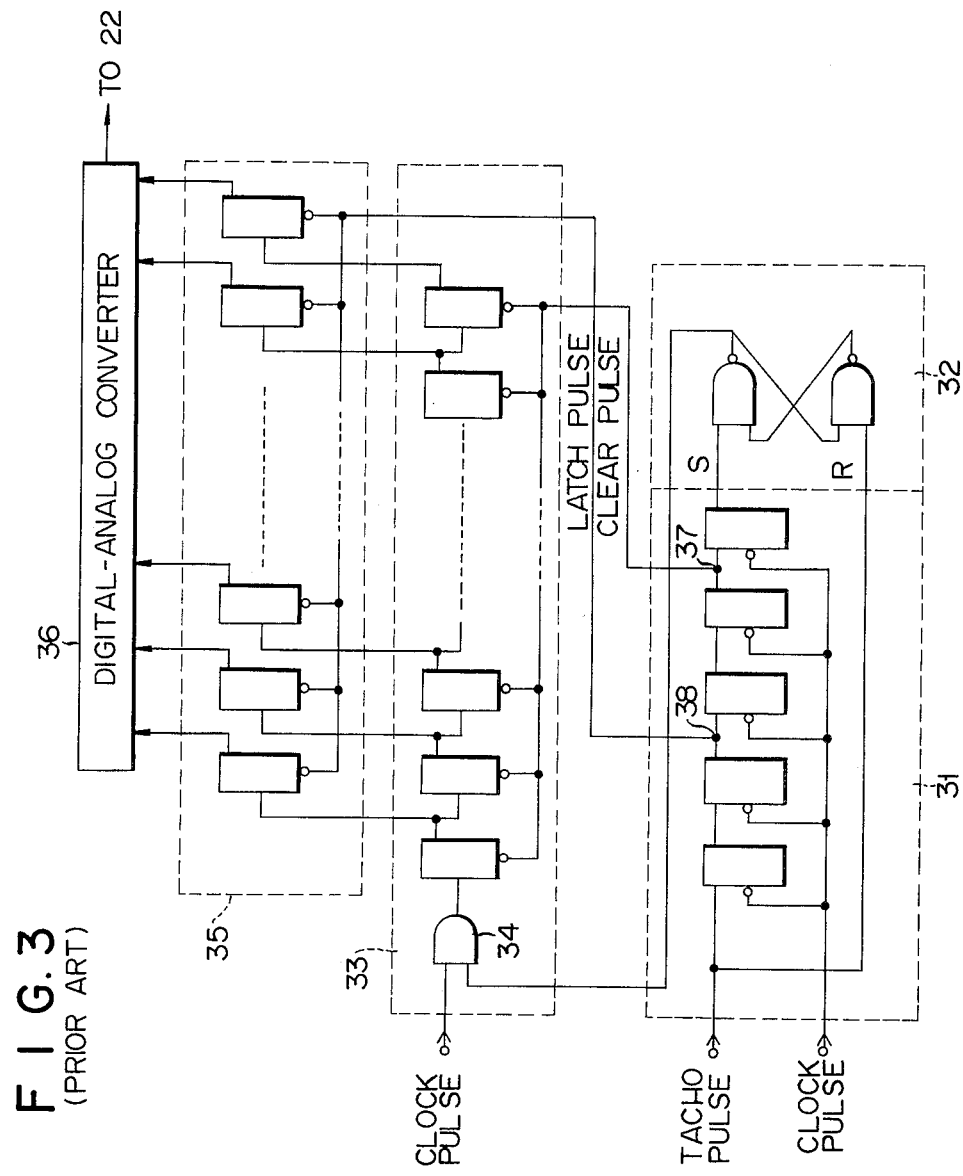
FIG. 3 is a block diagram showing a conventional pulse interval measuring circuit.
Figure 4:
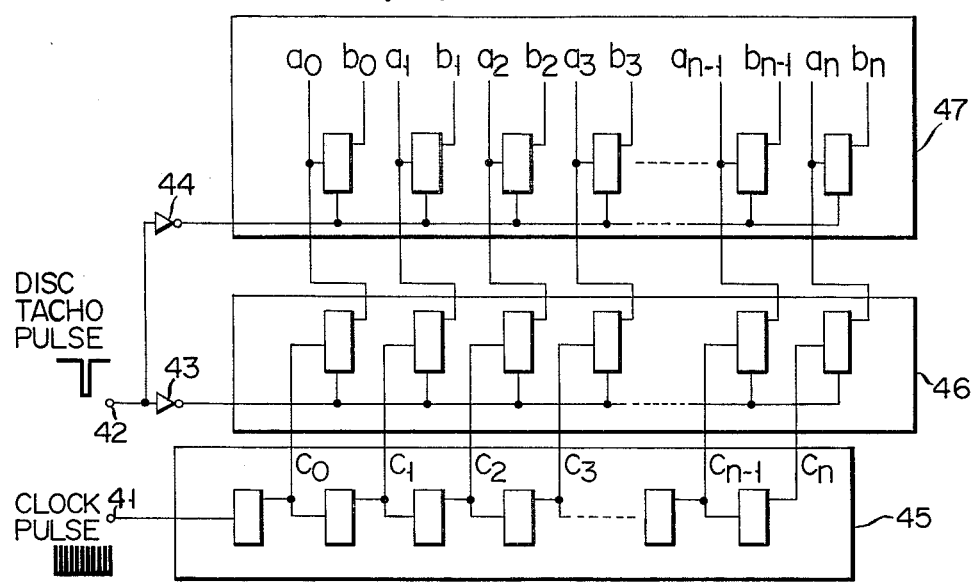
FIG. 4 is a circuit diagram showing one embodiment of a pulse inverval measuring circuit in an AFC loop.

FIG. 4 shows a disc servo system of a magnetic head of a video tape recorder. In the disc servo system the time interval of tacho pulses is measured to control the rotation speed of a disc motor. This is based on the fact that when the rotation speed of the motor is slow, a greater time interval is involved and when the rotation speed of the motor is fast, a smaller time interval is involved. In consequence, in order for the rotation speed of the motor to be made constant it is only necessary to control the time interval. A clock pulse is supplied to an input terminal 41 and disc tacho pulse is supplied to an input terminal 42. A binary counter 45 is connected to the input terminal. The binary counter 45 counts clock pulses to deliver a count output in a predetermined timing. The input terminal 42 is connected respectively through inverters 43 and 44 to the latch pulse input terminals of first and second latch circuits 46 and 47. The first latch circuit 46 has a configuration the same in bit numbers as the output bit numbers of the binary counter 45 and adapted to latch clock pulses counted at the binary counter 45, upon receipt of a latch pulse. The second latch circuit 47 has a configuration the same in bit numbers as those of the first latch circuit 46 and adapted to latch data latched at the first latch circuit 46, upon receipt of a latch pulse. When the tacho pulse is applied as a latch pulse to the first and second latch circuits 46 and 47, the memory contents of the first latch circuit 46 is shifted to the second latch circuit 47 and the contents of the counter 45 is transferred to the first latch circuit 46. In consequence, when a first tacho pulse is applied to the first and second latch circuits 46 and 47, the contents of the counter 45 is latched to the first latch circuit 46. Next when a second tacho pulse is supplied to the first and second latch circuits 46 and 47, the initial count value of the counter 45 is latched to the second latch circuit 47 and the present count value of the counter 45 is latched to the first latch circuit 46. If the data of the second latch circuit 47 is subtracted from the data of the first latch circuit 46, a time interval between the tacho pulses is obtained as digital data $$\{(a_0, a_1, a_2, a_3 ---, a_n) - (b_0, b_1, b_2, b_3, ---, b_n)\}$$

provided that the counter 45 continues its counting operation until the count value of the counter 45 is overflowed and cleared to zero with no intermediate clearing. The counter 45, first latch circuit 46 and the second latch circuit 47 are of a conventional type and constructed of D type flip-flop.

Figure 5:
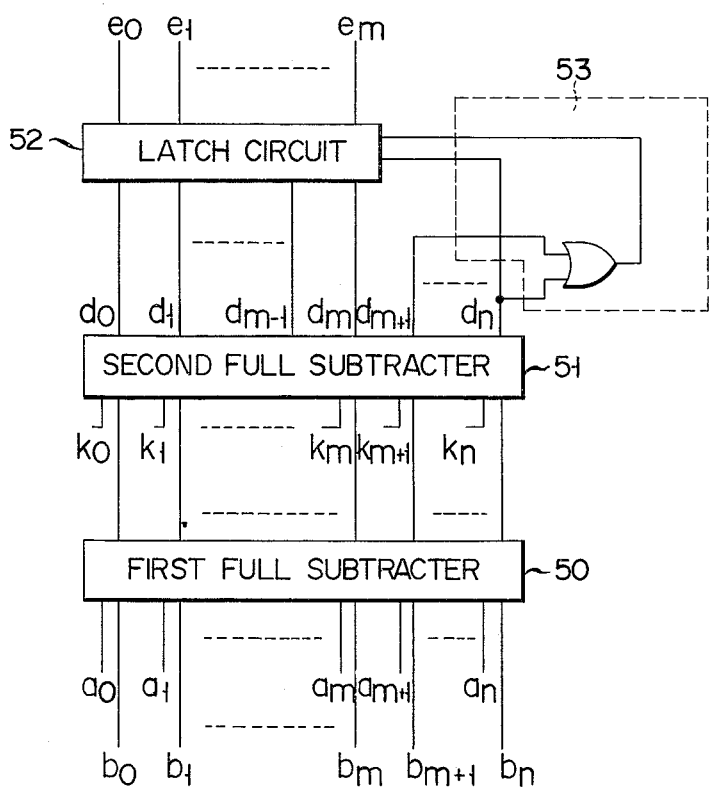
FIG. 5 is a circuit diagram showing a data processing circuit for processing an output of the circuit of FIG. 4.

FIG. 5 shows a data processing circuit for processing output data of the first and second latch circuits 46 and 47. A binary data A ($a_0, a_1, ---, a_n$) of the first latch circuit 46 and binary data B ($b_0, b_1, ---, b_n$) of the second latch circuit 47 are supplied to a first full subtractor 50 where a calculation $$(a_0, a_1, ---, a_n) - (b_0, b_1, ---, b_n)$$

is effected. The result of subtraction of the subtractor 40 is supplied to a second full subtractor 51. A constant K ($k_0, k_1, ---, k_n$) is also supplied to the second full subtractor 51. The second full subtractor 51 is adapted to subtract the constant K from the result of calculation (A−B). The constant K is used to relatively shift a data amount measured, since an actual control amount is represented by the bit number smaller than that of the first full subtractor 50. Now suppose that the first full subtractor 50 is of a 15-bit configuration. Then, a final control amount range can be expressed by 10 bit. In consequence, the constant K is used to convert the measured data amount so that a target value is obtained at the center of a control amount range of 0 to 1023 i.e. at 512. Data D ($d_0, d_1, ---, d_n$)=A ($a_0, ---, a_n$)−B($b_0, ---, b_n$)−K ($k_0, ---, k_n$) delivered from the second full subtractor 51 represents a predetermined data content. The upper several bits (for example, the upper 5 bits) are discriminated by a conditional discriminating circuit 53. The discrimination is effected as follows:

$$E = \begin{cases} 0 & \text{if } D \leq 0 \\ 2^m - 1 & \text{if } D \geq 2^m \\ A - B - K & \text{if } 0 < D < 2^m \\ (\text{provided } D = A - B - K, \text{ mode } 2^n) \end{cases}$$

At D≦0 the time interval of the tacho pulse is narrow.

Thus, the motor speed is faster and is departed from the lower limit of a control range (AFC range) preset. Therefore, the output of the latch circuit 52 is made E ($e_0, ---, e_m$)=(0, ---, 0) and when the analog conversion is effected the DC level goes toward the lower limit.

At D≧$2^m$ the time interval of the tacho pulse is great. Thus, the rotation speed of the motor is slow and is departed away from the upper limit of the control range (AFC range) preset. Therefore, the output of the latch circuit 52 is made E ($e_0, ---, e_m$)=(1, ---, 1) and when the analog conversion is effected the DC level goes toward the upper limit.

At $0<D<2^m$ the rotation speed of the motor is within the AFC range and the result of calculation represents control data.

The upper several bits of the above-mentioned count value D is inputted to the conditional discrimination circuit for discrimination. Suppose that the output bit number of the second full subtractor 51 is of a 15 bit (bits 0 to 14) configuration. In this case, the bits 10 to 14 are discriminated. That is, when the bit 14 is a logical 1 the count value D is negative and thus the bits 0 to 9 are all made at a logical 0. That is, $E=0$ (Note that the bit 14 is a sign bit). If any one of bit 10 to bit 14 is a logical 1, the count value D exceeds $2^{10}-1$ even if the lower bit, (bits 0 to 9) are all at a logical 0. Thus, $E=(e_0, ---, e_m)$ are made all at a logical 1. If the upper bits (bits 10 to 14) are all at the logical 0, the count value D is within a range of 0 to 1023. Thus, the bits 0 to 9 are delivered as an output.

In the circuit shown in FIGS. 4 and 5 the time interval of the tacho pulse from the phase detector of the magnetic head motor is represented by a difference of the count numbers and stored as digital data into the latch circuit and the digital data is converted to an analog data for supply to the drive circuit of the DC motor. The circuit arrangement is used for the AFC loop of the disc servo system and the APC loop of the disc servo system can be constructed in the same way as the AFC. In the APC loop, however, the time interval between the tacho pulse and the reference signals such as the vertical synchronizing signal of the television signal and so on is measured.

Figure 6:
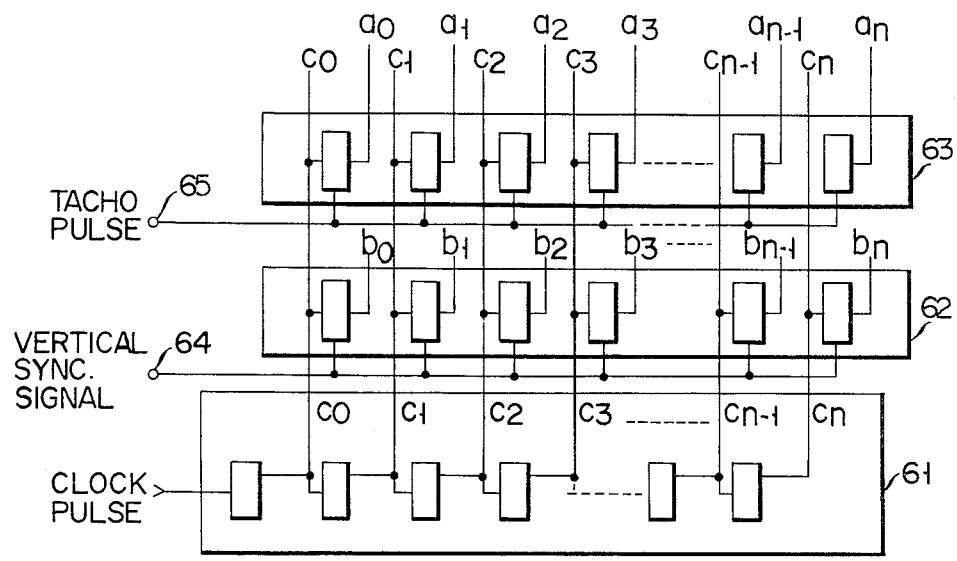
FIG. 6 is a circuit diagram showing one form of the pulse phase measuring circuit in an APC loop.

FIG. 6 shows a circuit arrangement for use in an APC loop of the disc servo system.

A counter 61 counts clock pulses and the count value of the counter 61 is latched to a first latch circuit 62 by a vertical synchronizing signal applied to an input terminal 64. When the tacho pulse is supplied to the input terminal 65, a count value counted up to this time is supplied to a second latch circuit 63. If the data $(b_0, ---, b_n)$ and $(a_0, ---, a_n)$ latched to the first and second latch circuits 62, 63 are supplied to the data processing circuit of FIG. 5 a predetermined control amount is obtained. The counter 61 and first and second latch circuits 62 and 63 are of a general type as in the case of the embodiment of FIG. 4 and is constructed of, for example, D type flip-flops.

An applied form of digital servo apparatus will now be explained below.

Suppose that the oscillation frequency $f_o$ of a crystal oscillator is 3,579,140 Hz, the cycle of $C_0$ is $T_0=4/f_o=1.117$ ($\mu$sec), the output data of the counter is 15 bits (n=14), and that the output data of the latch circuit 52 is 10 bits (m=9). In this case, a maximum number countable at the counter is $2^{15}-1=32,767$, the maximum cycle is 36.62 m sec ($=27.30$ Hz) and the cycle (16.66 m sec) of the vertical synchronizing is represented by a count value of 14928. Now suppose that the repetition frequency (the target value of AFC) of the tacho pulse of the capstan is 60 Hz and that a phase difference between the tacho pulse and the vertical synchronizing signal is 180°, i.e. a time difference between the tacho pulse and the vertical synchronizing signal is 8.33 m sec (target value of APC). Then, the target value is 14928 for AFC and 7464 for APC. FIG. 7 shows its time series. Since the counter has its contents circulated in a cycle of 32,767 steps, or 36.6m sec, it represents the time as shown in FIG. 7A. The output data (count number) are latched by the tacho pulse (FIG. 7B) and vertical synchronizing pulse (FIG. 7C) to the latch circuits to obtain a difference. That is, for the AFC loop, $D=A-B-(14928-512)$ in FIG. 7G, $D=900$) and for the APC loop, $D=A-B-(7464-512)$ (in FIG. 7I, $D=300$). FIGS. 7F and 7H show a relation of an operation amount to an analog amount in AFC and APC.

Figure 8:
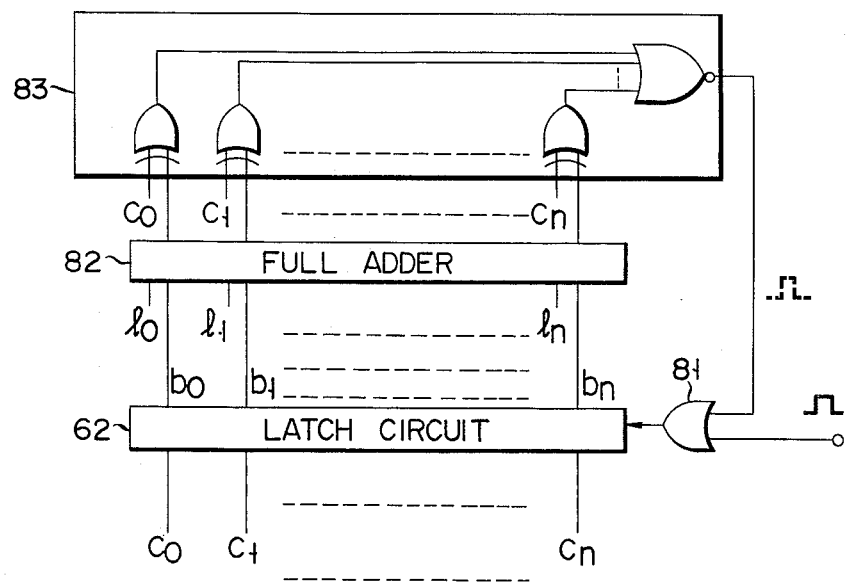
FIG. 8 is a circuit diagram showing one form of a dummy vertical synchronizing signal generator.

FIG. 8 shows a dummy vertical synchronizing signal generator as a compensation circuit. The dummy vertical synchronizing signal generator compensates for the lack of a vertical synchronizing signal, the state of which occurs for some reason when the vertical synchronizing signal is utilizes as a latch pulse. A vertical synchronizing signal which becomes a latch pulse later is supplied through an OR circuit 81 to a latch circuit 62. Since the cycle of the vertical synchronizing signal is constant, a fixed value $(l_0, -, l_n)$ is added to data latched by the first vertical synchronizing signal to the latch circuit 82 to obtain data which would be obtained from the second vertical synchronizing signal. That is, the fixed value L is added at a full adder 82 to data which is latched by the first vertical synchronizing signal. The output data of the full adder 82 is supposed to be a count value to be latched by the next vertical synchronizing signal. The output value of the full adder 82 and the output value of the counter 62 are ANDed together. When a coincidence occurs between both the outputs, a comparison circuit 83 delivers pulse as a dummy vertical synchronizing signal. Since this pulse is supplied to the OR circuit 81, the count number is latched in a predetermined timing to a latch circuit 62 even if the vertical synchronizing signal should be lost.

Figure 9:
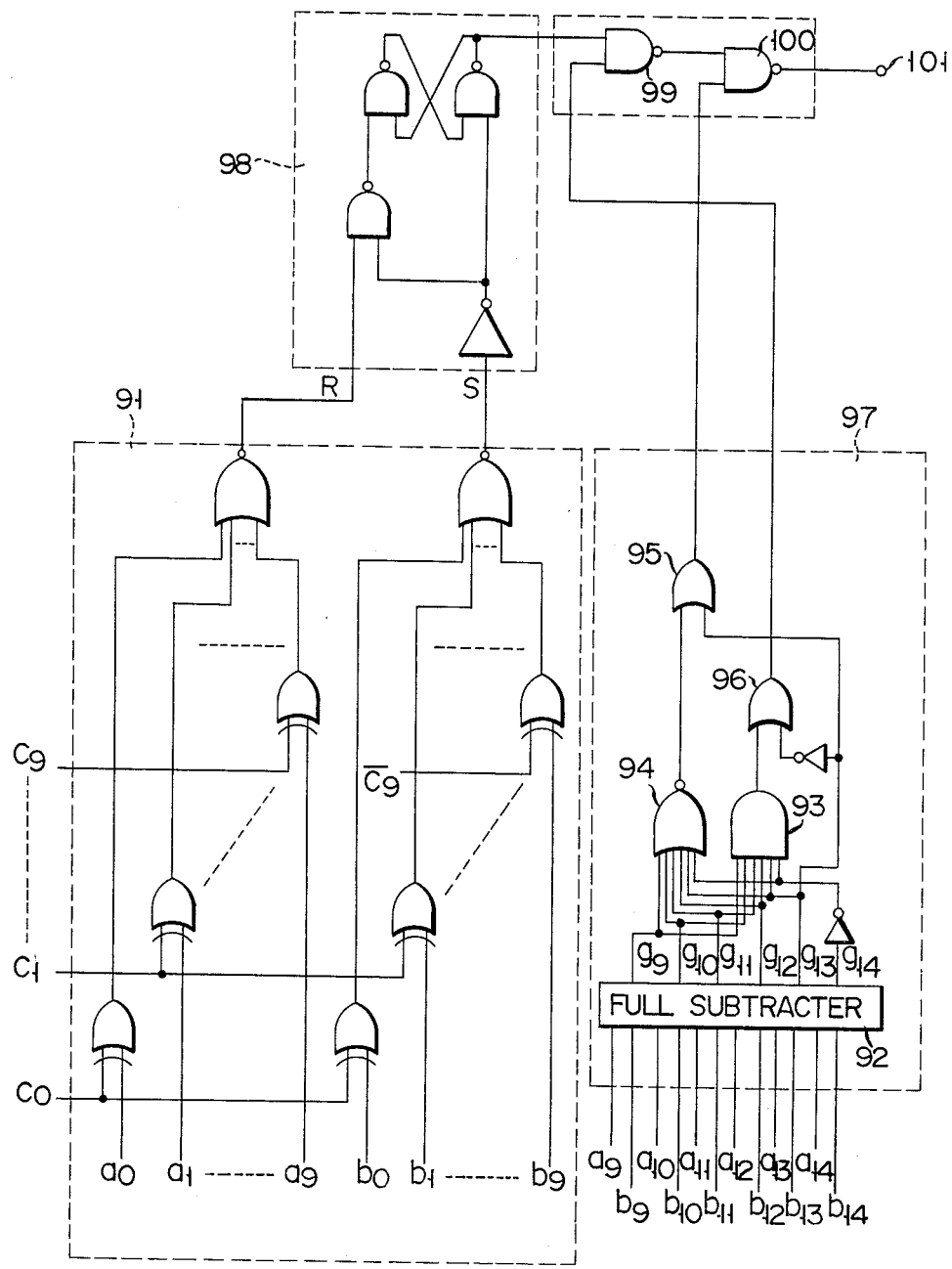
FIG. 9 is an explanatory block diagram showing other embodiment of the calculation circuit section.

FIG. 9 shows another form of a data processing circuit for processing the output of the latch circuit as shown in FIG. 4 or 6.

This circuit is adapted to select the cycle of the clock pulse and the bit number n of the counter such that an integral ratio is obtained between the cycle of the vertical synchronizing signal and the time cycle at which the counter makes one circulation. Since in such a circuit arrangement a constant value control (the values of the lower 10 bits (bits 0 to 9) of data amounts A, B are determined to be made equal i.e. to make constant a time interval of the tacho pulse and a time difference between the tacho pulse and the vertical synchronizing signal) is effected based on a vertical synchronizing signal of a time period over which the VTR disc and capstan are stable, if a latched count number (control amount) coincides with a target value (control amount=zero), the outputs A $(a_0, ---, a_n)$ and B $(b_0, ---, b_n)$ of the latch circuits become equal to each other except for their upper several bits. In this case, the lower m bits of the outputs A $(a_0, ---, a_n)$ and B $(b_0, ---, b_n)$ of the respective latch circuits 46, 47 or 62, 63 are used as the input data of a time difference data processing section 91 for effecting a pulse width modulation and the remaining upper several bits are used as data to be inputted to a conditional discriminating circuit 97. In this embodiment the counter bit number is 15 bits (bits 0 to 14), the cycle in which the bit 13 (count maximum value; 16383) makes one shift circulation is 16.66 m sec i.e. the same as the cycle of the vertical synchronizing signal, and the clock frequency of the counter is $1.01827\mu$ sec. When a coincidence between the data A $(a_0, ---, a_9)$ and the count value C $(C_0, ---, C_9)$ of clock pulses occurs at the time difference data processing section 91, a set pulse is applied to a flip-flop circuit 98. As a result, an output which is pulse width modulated at the bit 9 cycle ($1.01827 \times 1024 = 1.0427$ m sec) of the counter is obtained. In this case, in order to make the pulse width at a 50% duty when a target value is involved i.e. when a difference between the data A ($a_0, ---, a_i$) ($m-i \leq n$) and the data B ($b_0, ---, b_i$) ($m \leq i \leq n$) is zero, the data if the counter to be compared with the data B ($b_0, ---, b_9$) is inverted with its uppermost digit as $\overline{C}_9$ and then applied. That is, the counter data is displaced by 512. When out of the output bits of the counter 61 as shown in FIG. 10A, ($C_0, ---, C_9$) and ($C_0, ---, \overline{C}_9$) are zero, they are displaced at an interval of ½ hour as shown in FIGS. 10B and 10C. Suppose that the data A ($a_0, ---, a_9$) and B ($b_0, ---, b_9$) have both a coincidence value of, for example, 300. Since in this case the count starting point is displaced for the reason mentioned, a set pulse (see FIG. 10D) and reset pulse (see FIG. 10E) are inputted to the flip-flop circuit 98 with a 50% displacement. As a result, an output pulse with a width of ½ as shown in FIG. 10F is obtained from the flip-flop circuit 98.

In the conditional discrimination circuit 97, on the other hand, the subtraction between the data A ($a_9, ---, a_{14}$) and B ($b_9, ---, b_{14}$) is effected at a full subtractor 92 to produce a difference data G ($g_9, ---, g_{14}$). The difference data G is supplied to logic circuits 94, 95 and 96 where the respective logic operations are effected. Gate circuits 99 and 100 are controlled by the results of the above-mentioned logic operations. In this way, 1 or 0 or a pulse width modulated wave (from the flip-flop circuit 98) is derived from an output terminal 101.

FIG. 11A shows a variation of the data $g_{13}$. That is, the result of subtraction of the full subtractor 92 is a negative number when the data $g_{13}$ is at a logical "1" level and a positive number when the data $g_{13}$ is at a logical "0" level. FIGS. 11B, 11C, 11D, 11E and 11F show the output of the AND circuit 93, the output of the NOR circuit 94, the output of the OR circuit 95, the output of the OR circuit 96 and the average DC level on the output terminal 101. When in the discrimination circuits a logical "1" signal is applied to one input terminal of each of the NAND circuits 99 and 100 the average DC level on the output terminal 101 is within a control range of $X_1$ as shown in FIG. 11F. If the output of the full subtractor 92 is within the range of $X_2$, a logical "0" and logical "1" signal are applied respectively to the input terminals of the NAND circuits 99 and 100 as shown in FIGS. 11D and 11E. As a result, a low level output appears on the output terminal 101. If the output of the full subtractor 92 is within the range of $X_3$ as shown in FIG. 11F, a logical "1" and logical "0" signal are supplied to the terminals of the NAND circuits 99 and 100, respectively. As a result, a high level output emerges on the output terminal 101.

Therefore, when the output of the subtractor 92 is less than $2^{14} - 512$, equal to $2^{14} - 512$ to $2^{14} + 512$ and greater than $2^{14} + 512$, it is set to zero, a level corresponding to a pulse width modulated wave, and 1023, respectively. The accuracy of the output may be of order of 512. When 512 is substracted from the bit positions (bit 9, bit 10, bit 11, bit 12, bit 13, bit 14) exceeding 10 bit of A and B, if the upper order bits are discriminated, the control range can be distinguished. Table 1 shows the bit pattern of the upper order bits (bits 9 to 14) to each decimal numerical value.

TABLE 1

| DECIMAL | BINARY | | | | | |
|---|---|---|---|---|---|---|
| | $2^9$ | $2^{10}$ | $2^{11}$ | $2^{12}$ | $2^{13}$ | $2^{14}$ |
| −2048 | 0 | 0 | 1 | 1 | 1 | 0 |
| −1536 | 1 | 0 | 1 | 1 | 1 | 0 |
| −1024 | 0 | 1 | 1 | 1 | 1 | 0 |
| −512 | 1 | 1 | 1 | 1 | 1 | 0 |
| 0 | 0 | 0 | 0 | 0 | 0 | 1 |
| 512 | 1 | 0 | 0 | 0 | 0 | 1 |
| 1024 | 0 | 1 | 0 | 0 | 0 | 1 |
| 1536 | 1 | 1 | 0 | 0 | 0 | 1 |
| 2048 | 0 | 0 | 1 | 0 | 0 | 1 |

When bits 9 ($2^9$) to 13 ($2^{13}$) are all "1's" or all "0's", a pulse width modulated wave can be obtained from the pulse width modulation section. That is, when the upper order bits ($2^9$ to $2^{13}$ bits) are all "0's", remaining low order bits ($2^0$ to $2^8$) can take a value of 0 to 511 (decimal). When the upper order bits ($2^9$ to $2^{13}$) are all "1's", the remaining lower order bits ($2^0$ to $2^8$ bits) can take a value of $-512$ to $-1$ (decimal). Since these are within the digital control range not exceeding 1023 steps, a pulse width modulated wave can be outputted as it is. Under the other conditions the bit sign is discriminated (it is considered as a negative value when the $2^{13}$ bit is "1" and as a positive value when the $2^{13}$ is "0") and 0 is outputted when the sign is a negative value and 1023 is outputted when the sign is a positive sign.

The circuit of FIG. 9 is so set that n integral ratio is obtained between the cycle of the vertical synchronization signal and the circulating cycle of the counter circuit. The lower 10 bits are pulse width modulated by the scanning of the clock counter and caluclation is effected using only the upper 6 bits (bits 9 to 14) and then the conditional discrimination is effected. Since in this case the pulse width modulated wave is about 1 KHz, the DC response of the motor is obtained and thus a calculation circuit section as shown in FIG. 5 can be omitted.

The embodiment shown in connection with FIG. 9 and table 1 shows an example of the circuit which has a time difference of 16.66 m sec as a target value (, or the count value of the time difference $g = 0 \pmod{2^{14}}$) and table 1 shows by way of example values which the circuit produces.

Thus the circuit 91, 97 shown in FIG. 9 can be modified a variety of ways and the value of table 1 also can be changed differently.

FIG. 12 shows a dummy vertical synchronizing signal generating circuit in a time interval measuring circuit for measuring a time interval between the vertical synchronizing signal and the tacho signal. The dummy vertical synchronizing signal generating circuit serves as a compensation circuit for compensating for a lack of the vertical synchronizing signal when a control variable corresponding to the time difference is formed.

In this circuit, the circulating cycle of the counter 61 is set to an integral multiple of the cycle of the vertical synchronizing signal and thus a predetermined relation exists between the time at which the vertical synchronizing signal is supplied through an inverter 124 to a latch circuit 125 and a present time data counted by the counter 61. Data latched to the latch circuit 125 is processed by a data processing circuit shown in FIG. 5 and FIG. 9, and at the same time supplied to a comparing circuit 121. The output data of the counter 61 is applied to the comparing circuit 121. When both the data coincide, an output signal is derived from the comparing circuit 121. The output of the comparing circuit 121 is fed through NOR circuits 122 and 123 and a dummy vertical synchronizing signal is generated. The count bits adapted to make a shift circulation at the same cycle as that of the vertical synchronizing signal can be cleared by the vertical synchronizing signal so as to have its output data based on the data (0, - - - , 0). This obviates the necessity of the comparing circuits 121, 122 of FIG. 12 and thus the number of parts or elements can be reduced.

Figure 13:
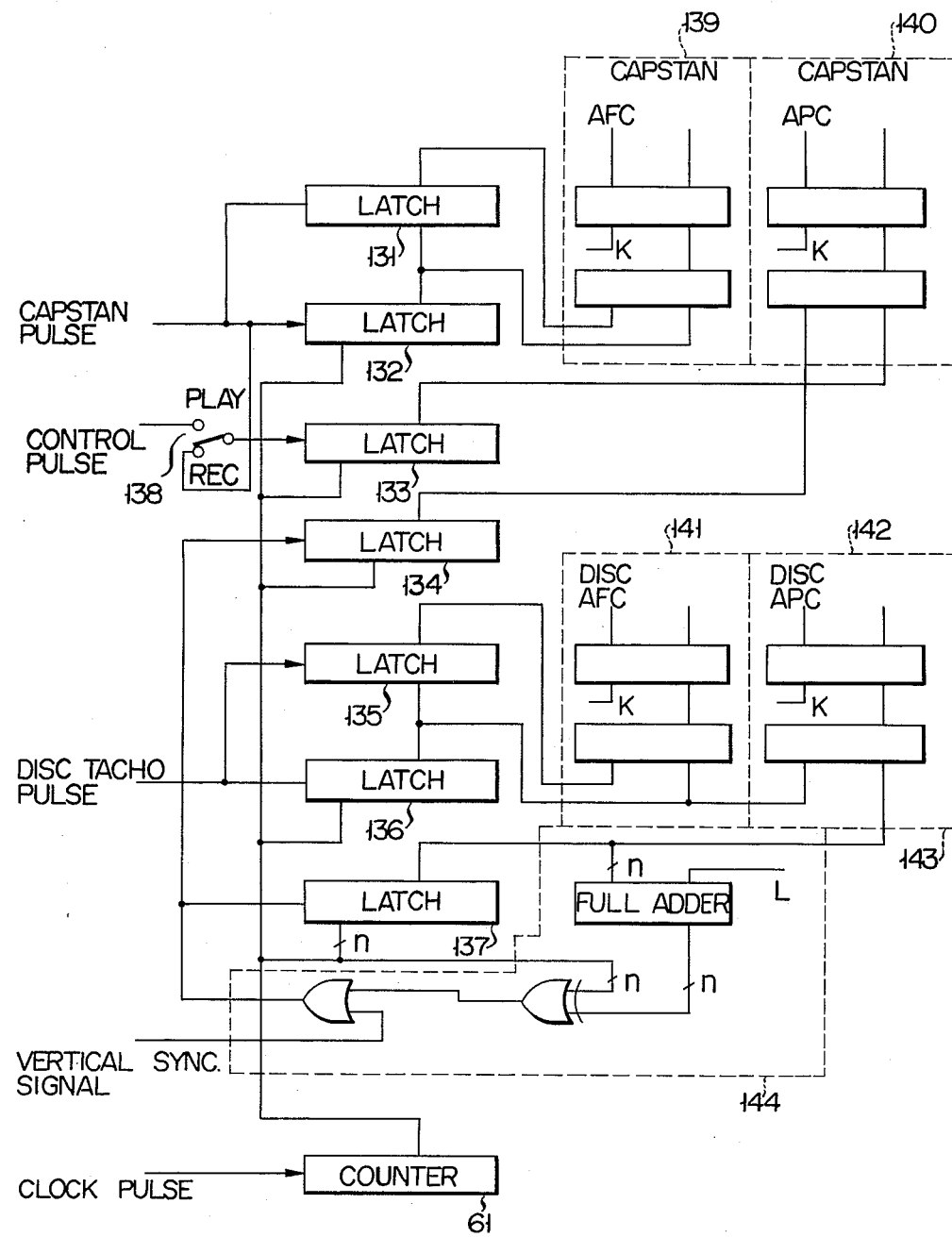
FIG. 13 is a block schematic diagram using disc type AFC and APC loops and capstan type AFC and APC loops in a VTR servo utilizing a calculation scheme of FIG. 5.

FIG. 13 is a block diagram showing a circuit arrangement using disc type AFC loops and capstan type AFC and APC loops in the VTR servo utilizing a calculation system of FIG. 5. A counter 61 counts clock pulses applied to the input terminals and the data of the counter 61 is latched to latch circuits 131, 132, 133, 134, 135, 136 and 137. The latch circuits 131 and 132 are connected in a configuration as shown in FIG. 4, and the data latched to the latch circuits 131 and 132 are supplied to a calculation circuit section 139. The calculation cirucit section 139 has an arrangement as explained in connection with FIG. 5. The output of the calculation circuit section 139 is used as an output of the capstan AFC loop. During the recording time, the latch circuits 133 and 134 measure a time interval between the capstan tacho pulse and the vertical synchronizing signal (dummy vertical synchronizing signal). During the reproducing time a switch 138 is switched and the latch circuits 133 and 134 measure a time interval between the vertical synchronizing signal (dummy vertical synchronizing signal) and the control pulse. The latch circuits 133 and 134 are connected in a configuration as shown in FIG. 6 and the outputs of the latch circuits 133 and 134 are applied to a calculation circuit section 140 as explained in connection with FIG. 5. The output of the calculation circuit section 140 is used as the output of the capstan type APC loop. The latch circuits 135 and 136 measure a time interval of the disc tacho pulse and explained in a configuration as shown in FIG. 4. The outputs of the latch circuits 135 and 136 are applied to a calculation circuit section 141. The output signal of the calculation circuit section 141 is used as a disc type AFC loop. The latch circuits 136 and 137 can measure a time interval between the disc tacho pulse and the vertical synchronization signal (dummy vertical synchronizing signal). The latch circuits 136 and 137 are connected in a configuration as shown in FIG. 6 and the outputs of the latch circuits 136 and 137 are applied to a calculation circuit section 142 of a configuration as shown in FIG. 5. The output signal of the calculation circuit section 142 is used as a disc type AFC loop. The latch circuits 136 and 137 can measure a time interval between the disc tacho pulse and the vertical synchronization signal (dummy vertical synchronizing signal). The latch circuits 136 and 137 are connected in a configuration as shown in FIG. 6 and the outputs of the latch circuits 136 and 137 are applied to a calculation circuit section 142 of a configuration as shown in FIG. 5. The output signal of the calculation circuit section 142 is used as a disc type APC output. The dummy vertical synchronizing signal generating circuit 144 adds a constant L to the output of the latch circuit 137, compares the result of addition and the output of the counter 61 and delivers an output when a coincidence occurs between the result of addition and the output of the counter 61.

Figure 14:
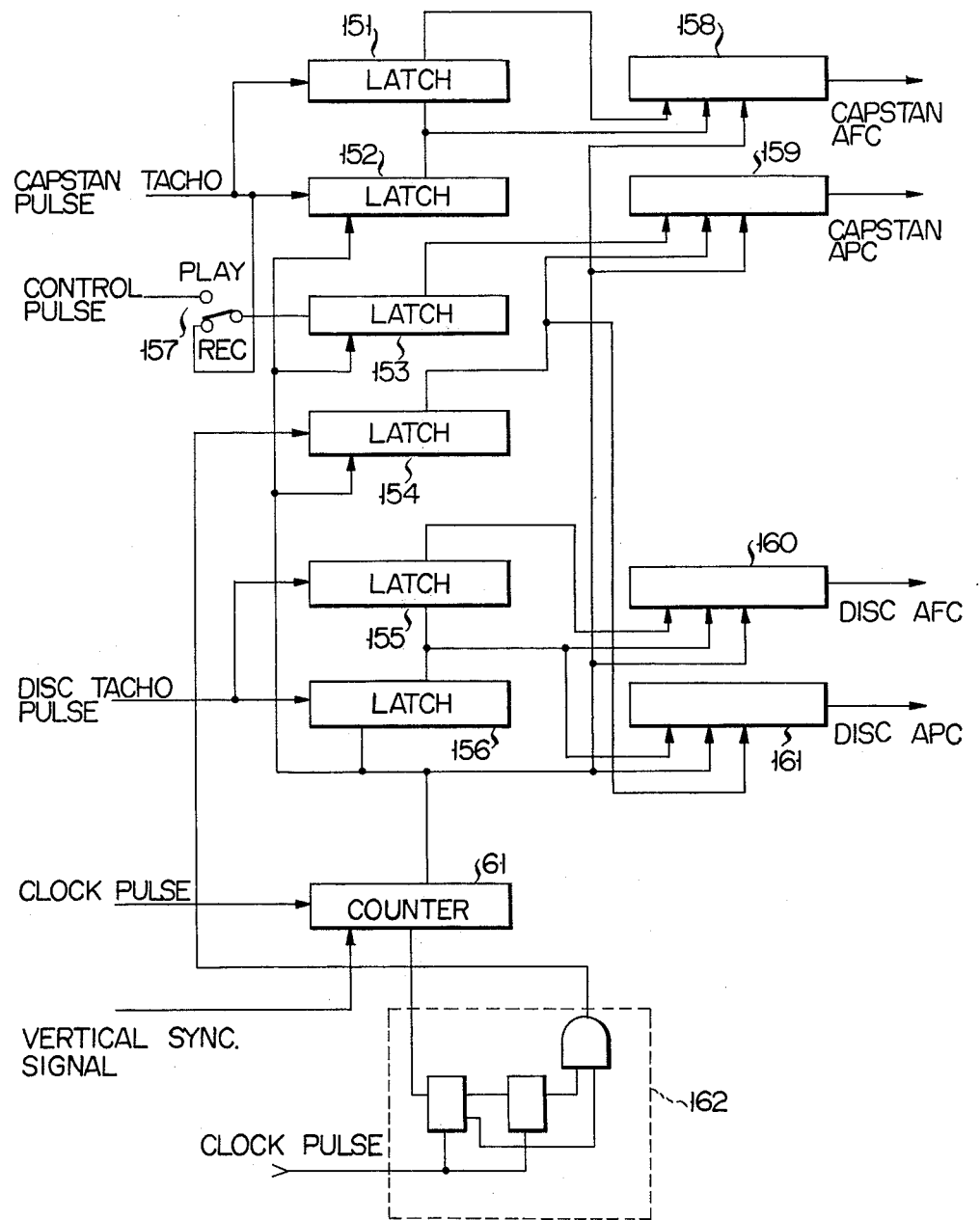
FIG. 14 is a block diagram showing a time difference data processing system used in the disc type AFC and APC loops of a VTR servo.

FIG. 14 is a block diagram showing a time difference data processing system used in disc type AFC and APC loops and capstan type AFC and APC of the VTR servo. The counter 61 counts clock pulses applied to the input terminal and the count bits adapted to make a shift circulation at the same cycle as that of the vertical synchronizing signal is cleared by the vertical synchronizing signal. The count value of the counter 61 is latched by an arbitrary latch pulse to the latch circuits 151, 152, 153, 154, 155 and 156. The count data is supplied to the time difference data processing and pulse width modulation circuit sections 158, 159, 160 and 161. The latch circuits 151 and 152 measure a time interval of the capstan tacho pulse. The outputs of the latch circuits 151, 152 are supplied to the time difference data processing and pulse width modulation circuit section 158. The data processing and pulse width modulation circuit section 158 performs the same operation as explained in connection with FIG. 9. As a result, the output of the circuit 158 is utilized as the output of the capstan AFC output. The latch circuits 153 and 154 measures, during the recording time, a time interval between the capstan tacho pulse and the vertical synchronizing signal (dummy vertical synchronizing signal). During the reproducing time a switch 157 is switched and the latch circuits 153 and 154 measure a time interval between the control pulse and the vertical synchronizing signal (dummy vertical synchronizing signal). The output of the latch circuits 153 and 154 is supplied to the time data processing and pulse width modulation circuit 159. The output of the circuit 159 is utilized as a capstan APC output. The latch circuits 155 and 156 measure the time interval of the disc tacho pulse. The outputs of the latch circuits 155 and 156 are supplied to the time difference data processing and pulse width modulation circuit section 160. The output of the circuit section 160 is utilized as a disc type AFC output. The latch circuit 156 and counter circuit 61 measure a time interval between the disc tacho pulse and the vertical synchronizing signal. The outputs of the latch circuit 156 and the counter circuit 61 are applied to the time difference data processing and pulse width modulation circuit section 161. The output of the circuit section 161 is utilized as the disc AFC output. Since the counter 61 is cleared by the vertical synchronizing signal, this time may be used as a reference.

A dummy vertical synchronizing signal generating circuit 162 is adapted to take one of bits from the counter having a cycle the same as the vertical synchronizing signal and generate a dummy vertical synchronizing signal when the bit is changed from 1 to 0.

According to the digital servo apparatus of this invention a control amount is obtained by one counter with respect to a plurality of control loops. A first and a second measuring signal (tacho pulse, vertical synchronizing signal etc.) used in each control loop may be applied as latch pulses. If, out of signals to be measured, a lack of one signal (vertical synchronizing signal) occurs, a dummy vertical synchronizing signal is generated from the dummy vertical synchronizing signal generating circuits. Thus, an accurate operation is obtained. The dummy vertical synchronizing signal generating circuit of FIG. 8 is adapted to beforehand calculate the constant data corresponding to one cycle of the vertical synchronizing signal, full adder 82 add this data to the immediately preceding latched time data, compare the result of addition with the number of counters, and deliver a dummy vertical synchronizing signal when a coincidence of both is obtained. The dummy vertical synchronizing signal is applied through the OR circuit 81 to the latch circuit 62 and thus a counter output is latched.

The dummy vertical synchronizing signal generating circuit of FIG. 12 is so set that the circulating cycle of the counter is an integral multiple of the cycle of the vertical sunchronizing signal. In this circuit, the output of the latch circuit is supplied to the comparing circuit, and a counter output data obtained (when a vertical synchronizing signal is applied) is supplied to the comparing circuit. When a coincidence occurs between the data of the latch circuit and the data of the counter, a dummy vertical synchronizing signal is generated. Since the output data of the first and second latch circuits are all equal to each other except for the upper several bits, the calculating circuit is simplified. The time difference data processing and pulse width modulation circuit shown in FIG. 9 is adapted to apply the upper several bits of count data counted by the n-bit counter to the conditional discrimination circuit and directly pulse width modulate the remaining lower m bits. This eliminates the necessity for providing a digital-analog converter. Thus, reduction in the number of elements, as well as a lowering of costs, is attained. In order for an output pulse width to be a 50% duty when the m bits of the output data of the first and second latch circuits coincide with each other (i.e. a difference of both is zero), the output data $(a_0, ---, a_{m-1})$, $(b_0, ---, b_{m-1})$ of the counter are modified such that they become $(C_0 \sim C_{m-1})$, $(C_0 \sim \overline{C}_{m-1})$. Thus, the digital servo apparatus can be so set that an operation amount is located at the center of the upper and lower limits when the target value and the control amount are zero.

The add/subtract processing section, conditional discrimination section and data comparing section can be softwarized using a microprocessor.

The digital servo apparatus according to this invention uses a digital signal in the servo system, permitting a highly integrated circuit version. The time difference calculation and pulse width modulation section can simplify data processing using a microprocessor etc. The digital servo apparatus can be made more compact than the conventional analog apparatus. Since data on a phase difference or frequency difference can be represented in a binary mode, the apparatus is not susceptible to a temperature variation or a power supply variation and the position operation of the sample/hold circuit is provided. Further, elements of high capacitance such as a DC amplifier, multi-vibrator etc. are not required, thus involving no drift on the operating point nor a variation of gain. As a result, a stable operation is assured.

What we claim is:
1. Digital servo apparatus for controlling a motor comprising:
   a binary counter adapted to receive clock pulses and having a binary output with a count value based on the number of clock pulses received;
   first memory circuit means connected to said binary counter for storing an output of said counter in response to a first latch pulse which is a vertical synchronizing signal of a television signal;
   secondary memory circuit means connected to said binary counter for storing an output of said counter in response to a second latch pulse taken from the motor to be controlled;
   data processing circuit means connected to said first and second memory circuit means for calculating an amount of control of said motor from the difference between the stored data of said first memory circuit means and the stored data of said second memory circuit means.

2. Digital servo apparatus according to claim 1, further comprising:
   a dummy vertical synchronizing signal generating circuit for generating a dummy vertical synchronizing signal as the first latch pulse, when the vertical synchronizing signal which is the first latch pulse is lost, including a logic circuit, memory circuit means for receiving a latch pulse constituted of the vertical synchronizing signal through said logic circuit, a full adder connected to said memory circuit means to add a predetermined constant to the output of said memory circuit means, and a comparison circuit connected to said full adder to deliver a dummy vertical synchronizing signal as the first latch pulse to said logic circuit when upon comparison a coincidence occurs between the output data of the full adder and the output data of said binary counter.

3. Digital servo apparatus according to claim 1, in which a constant to be added to the output data of said first memory circuit means is a value obtained by beforehand calculating the time of the vertical synchronizing signal to be generated through the synchronizing of said vertical synchronizing signal and effecting calculation based on said time.

4. Digital servo apparatus according to claim 1, further including a dummy vertical synchronizing signal when a vertical synchronizing signal as a second latch pulse is lost, said dummy vertical synchronizing signal generating circuit comprising:
   further memory circuit means for receiving the latch pulse comprised of the vertical synchronizing signal and stored output data of said counter;
   a plurality of comparing circuits connected to said further memory circuit means to compare output data of said further memory circuit means and output data of said counter in response to the next latch pulse constituted of the vertical synchronizing signal;
   a first logic circuit for taking a logical sum of the output data of the plurality of said comparing circuits; and
   a second logic circuit for taking a logical sum of the output value of the first logic circuit and the latch pulse constituted of said vertical synchronizing signal.

5. Digital servo apparatus according to claim 1, in which said data processing circuit means comprises:
   a first full subtractor for taking the difference between the output data of said first and second memory circuit means;
   a second full subtractor connected to said first full subtractor to subtract a predetermined constant from the output of said first full subtractor so that the output data can be compared with a predetermined control range through calculation;
   a condition discrimination circuit comprised of a logic circuit and connected to said second full subtractor for judging the upper bits of the output data of said second full subtractor, for calculating whether or not the output data of the second full subtractor is within a predetermined control range and for delivering predetermined data based on the result of such a calculation; and a latch circuit for storing the output data of said second full subtractor or the output data of said condition discrimination circuit based on the result of calculation by said second full subtractor and judgement by said condition discrimination circuit.

6. Digital servo apparatus according to claim 6, in which said condition discrimination circuit is comprised of a logic circuit for judging the upper bits of the output data of said second full subtractor and for delivering an upper limit value of said control range to said latch circuit when the output data of the second full subtractor is deviated from said upper limit value, a lower limit value to the latch circuit when the output data of said second full subtractor is deviated from said lower limit value, and data representative of the lower bits of the second full subtractor to said latch circuit when the output data of the second full subtractor is within said control range.

7. Digital servo apparatus according to claim 1, in which the clock pulse frequency and the bit number of the count circuit are selected such that the cycle of said vertical synchronizing signal and the cycle at which the contents of said binary counter makes one circulation constitute an integral ratio.

8. Digital servo apparatus according to claim 1, in which said data processing circuit means comprises:
a condition discrimination circuit for judging the upper bits of respective data outputted from said first and second memory circuit means, for checking whether or not the data is within a predetermined control range and for delivering predetermined data based on such a checking;
a time difference data processing unit adapted to receive the lower bits of output data delivered from said first and second memory circuit means and, when upon comparison a coincidence occurs between the output value of said binary counter and said respective output data, deliver a signal to permit the output pulses of said first and second memory circuit means to be pulse width modulated;
a flip-flop circuit connected to said time difference data processing unit to produce a signal different in duty cycle upon receipt of an output signal from said time difference data processing unit; and
a gate circuit connected at one end to said flip-flop circuit and at the other end to said condition discrimination circuit for selectively producing an output signal from said flip-flop circuit based on the result of judgement of said condition discrimination circuit.

9. Digital servo apparatus according to claim 8, in which said condition discrimination circuit comprises:
a full subtractor for receiving the upper bits of respective data outputted from said first and second memory circuit means and for taking the difference between these data; and
a logic circuit connected to said full subtractor for delivering a logic value to said gate circuit such that when the result of subtraction by said full subtractor is within a control range an average level value is produced, that when the result of said subtraction is deviated from the upper limit of said control range a high level signal is produced, or that when the result of said subtraction is deviated from the lower limit of said control range a low-level signal is produced from said gate circuit.

10. Digital servo apparatus according to claim 8, in which said time difference data processing unit comprises:
a first logic circuit group for taking a logical sum of output data from said first memory circuit means and output data from said counter; and
a second logic circuit group for taking a logical sum of output data from said second memory circuit means and output data from said counter.

11. Digital servo apparatus according to claim 10, in which in one of said first and second logic circuit groups the most significant bit of said counter is applied in an inverted form.

12. Digital servo apparatus for controlling a motor comprising:
a cyclic binary counter connected to receive a clock pulse for outputting a count value in the binary form based on the number of clock pulses counted;
first memory circuit means connected to said binary counter for storing an output of said counter in response to a first latch pulse taken from the motor to be controlled;
second memory circuit means connected to said first memory circuit means for storing output data of said first memory circuit means in response to a second latch pulse taken from the motor to be controlled; and
data processing circuit means connected to said first and second memory circuit means for calculating a control amount of said motor from a difference between output data of said first memory circuit means and output data of said second memory circuit means.

13. Digital servo apparatus according to claim 12, in which said data processing circuit means comprises:
a first full subtractor for taking the difference between the output data of said first and second memory circuit means;
a second full subtractor connected to said first full subtractor for subtracting a predetermined constant from the output data of said first full subtractor so that the output data of said first full subtractor can be compared with a predetermined control range through calculation;
a condition discrimination circuit comprised of a logic circuit and connected to said second full subtractor for judging the upper bits of the output data of said second full subtractor, for calculating whether or not the output data of said second full subtractor is within a predetermined range and for outputting predetermined data based on said calculation; and
a latch circuit for storing output data of said second full subtractor or output data of said condition discrimination circuit based on the result of calculation by said full subtractor and the result of judgement by said condition discrimination circuit.

14. Digital servo apparatus accordinng to claim 13, in which said condition discrimination circuit is comprised of a logic circuit for judging the upper bits of output data of said second full subtractor and for delivering an upper limit value of said control range to said latch circuit when the output data of said second full subtractor is deviated from said upper limit value, a lower limit value of said control range to said latch circuit when the output data of said second full subtractor is deviated from said lower limit value and data representative of the lower bits of said second full subtractor to said latch circuit when the output data of said second full subtractor is within said control range.

15. Digital servo apparatus according to claim 12, in which said data processing circuit means comprises:
a condition discrimination circuit for judging the upper bits of respective data outputted from said first and second memory circuit means, for checking whether or not the data is within a predetermined control range and for delivering predetermined data based on the result of checking;
a time difference data processing unit adapted to receive the lower bits of output data outputted from said first and second memory circuit means and to deliver a signal, when upon comparison a coincidence occurs between the output value of said binary counter and the respective output data, to permit the output pulses of said first and second memory circuit means to be pulse width modulated;
a flip-flop circuit connected to said time difference data processing unit to deliver a signal different in duty cycle in response to an output signal from said time difference data processing unit; and
a gate circuit connected at one end to said flip-flop circuit and at the other end to said condition discrimination circuit for selectively delivering an output signal from said flip-flop circuit based on the result of judgement by said condition discrimination circuit.

16. Digital servo apparatus according to claim 15, in which said condition discrimination circuit comprises:
a full subtractor connected to receive the upper bits of respective data outputted from said first and second memory circuit means to obtain a difference therebetween; and
a logic circuit connected to said full subtractor for delivering a logic value to said gate circuit such that when the result of subtraction by the full subtractor is within a control range an average level signal is delivered to said gate circuit, that when the result of said subtraction is deviated from the upper limit of said control range a high level signal is delivered to said gate circuit, or that when the result of said subtraction is deviated from the lower limit of said control range a low level signal is delivered to said gate circuit.

17. Digital servo apparatus according to claim 15, in which said time difference data processing unit comprises:
a first logic circuit group for taking a logical sum of output data from said first memory circuit means and output data from said counter; and
a second logic circuit group for taking a logical sum of output data from said second memory circuit means and output data from said counter.

18. Digital servo apparatus according to claim 17, in which in one of said first and second logic circuit groups the most significant bit of said counter is applied in an inverted form.

* * * * *